United States Patent
Nagayama et al.

(10) Patent No.: US 6,507,578 B1
(45) Date of Patent: *Jan. 14, 2003

(54) CHANNEL DIVISION CONTROL EQUIPMENT OF THE ISDN PRIMARY RATE INTERFACE CIRCUIT

(75) Inventors: Sakae Nagayama, Koriyama (JP); Kiyokazu Sanpei, Koriyama (JP); Junichi Aita, Koriyama (JP)

(73) Assignee: Hitachi Telecom Technologies, LTD., Fukushima-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/584,471

(22) Filed: Jun. 1, 2000

Related U.S. Application Data

(63) Continuation of application No. 08/698,850, filed on Aug. 16, 1996.

(30) Foreign Application Priority Data

Aug. 29, 1995 (JP) .............................................. 7-220279

(51) Int. Cl.[7] .............................................. H04L 12/50
(52) U.S. Cl. ...................................... 370/357; 379/258
(58) Field of Search ................................ 370/357, 359, 370/360, 522, 524, 420; 379/210, 211, 212, 243, 258

(56) References Cited

U.S. PATENT DOCUMENTS

| | | | | |
|---|---|---|---|---|
| 5,153,908 A | * | 10/1992 | Kakizawa et al. | 379/157 |
| 5,233,648 A | * | 8/1993 | Nakamura | 379/211 |
| 5,251,254 A | * | 10/1993 | Tanigawa et al. | 379/165 |
| 5,268,958 A | * | 12/1993 | Nakano | 379/211 |
| 5,291,549 A | * | 3/1994 | Izumi | 379/233 |
| 5,408,527 A | * | 4/1995 | Tsutsu | 379/212 |
| 5,410,539 A | * | 4/1995 | Ikeno | 379/212 |
| 5,579,300 A |   | 11/1996 | Lee et al. | 370/211 |
| 5,649,004 A |   | 7/1997 | Ikeno et al. | 379/212 |
| 6,141,343 A | * | 10/2000 | Nagayama et al. | 370/357 |

* cited by examiner

*Primary Examiner*—Wellington Chin
*Assistant Examiner*—Frank Duong
(74) *Attorney, Agent, or Firm*—Antonelli, Terry, Stout & Kraus, LLP

(57) ABSTRACT

An ISDN primary rate interface circuit having a plurality of communication channels, includes a channel division controller. According to predetermined conditions, the channel division controller selects a communication channel out of the plurality of communication channels when generating or receiving a call. The channel division controller provides private branch exchange by enabling allocation of the selected communication channel to an extension group according to a predetermined condition when generating or receiving the call.

3 Claims, 9 Drawing Sheets

CHANNEL DIVISION CONTROL EQUIPMENT OF THE ISDN PRIMARY RATE INTERFACE CIRCUIT

This is a continuation of application Ser. No. 08/698,850, filed Aug. 16, 1996.

FIELD OF THE INVENTION

This invention relates to a channel division control equipment of the ISDN primary rate interface circuit when a call is received by the private automatic branch exchange (PABX) accommodating the ISDN primary rate interface circuit.

BACKGROUND OF THE INVENTION

In the past, in a PABX accommodating multiple analog circuits and using multiple telephone numbers where operation is made by allocating a circuit and a telephone number to a certain extension group, the above operation has been executed by acquiring the circuit allocated by the control of the PABX when making a call from an extension number, and by allocating the receiving circuit for each telephone number by the control of the switchboard at the telephone office when receiving a call.

Therefore, in this type of equipment, the ISDN primary rate interface circuit had to be handled as a group when accommodating the ISDN primary rate interface circuit, and a circuit could not be divided for a certain extension group and handled independently. For example, suppose there are three groups, A, B and C, as the communication channels and the calling parties, and suppose they jointly use 23 channels, if group A occupies many channels, there was a problem that B and C could not use those channels, thus channel availability was restricted by the use by group A, a third party, which was inefficient.

SUMMARY OF THE INVENTION

In a PABX accommodating the ISDN primary rate interface circuit and using multiple telephone numbers, in order not to be restricted in use by the use by other group(s), the communication channels need to be preallocated to the extension groups. And, operation by allocating the communication channels of the ISDN primary rate interface circuit to the extension groups can be achieved by using the communication channels allocated by the control of the PABX when making a call from an extension number.

When receiving a call, however, the current method is such that an available channel is designated for response after the destination number information element, including the channel identification element, is received when a call is received from the switchboard office. As a result, a call cannot be received by designating a communication channel of the ISDN primary rate interface circuit for each telephone number, and therefore, a problem exists that a method of preallocating the communication channels to each extension group by dividing the communication channels of the ISDN primary rate interface circuit cannot be accomplished. Furthermore, even in the case where it has been enabled for a call to be received by designating communication channel of the ISDN primary rate interface circuit, there was a problem that allocation of the communication channels could not be changed easily because a change of the communication channel allocation required a data change at the office switchboard.

This invention is made in consideration of the above problems, and it is intended to provide a control equipment for a PABX which enables easy change of the communication channel allocation of the ISDN primary rate interface circuit as well as enabling an operation by allocating the communication channels of the ISDN primary rate interface circuit to the extension groups.

In order to solve above problems, the channel division control equipment of the ISDN primary rate interface circuit under this invention consists of a memory unit, a switch control means which selects a communication channel when making a call from an extension number, and a switch control means which selects a communication channel when receiving a call from the ISDN primary rate interface circuit. The memory unit stores an extension number/extension group cross-reference table where the extension numbers and the extension group numbers are related to each other, a communication channel/channel group cross-reference is table where the communication channels of the ISDN primary rate interface circuit and the channel group numbers are related to each other, a destination number/channel group cross-reference table where the destination numbers and the channel groups are related to each other, a global channel group cross-reference table where the control channel numbers and the channel group numbers are related to each other when the destination number information element informed from the ISDN primary rate interface circuit and the channel group number do not relate to each other and when the destination number information element is not informed, and an extension group/channel group cross-reference table where the extension group numbers and the channel group numbers are related to each other.

BEST MODE OF THE INVENTION

The construction of the channel division control equipment of the ISDN primary rate interface circuit under this invention is explained below in detail using FIG. 1 through FIG. 6.

Figure 1:
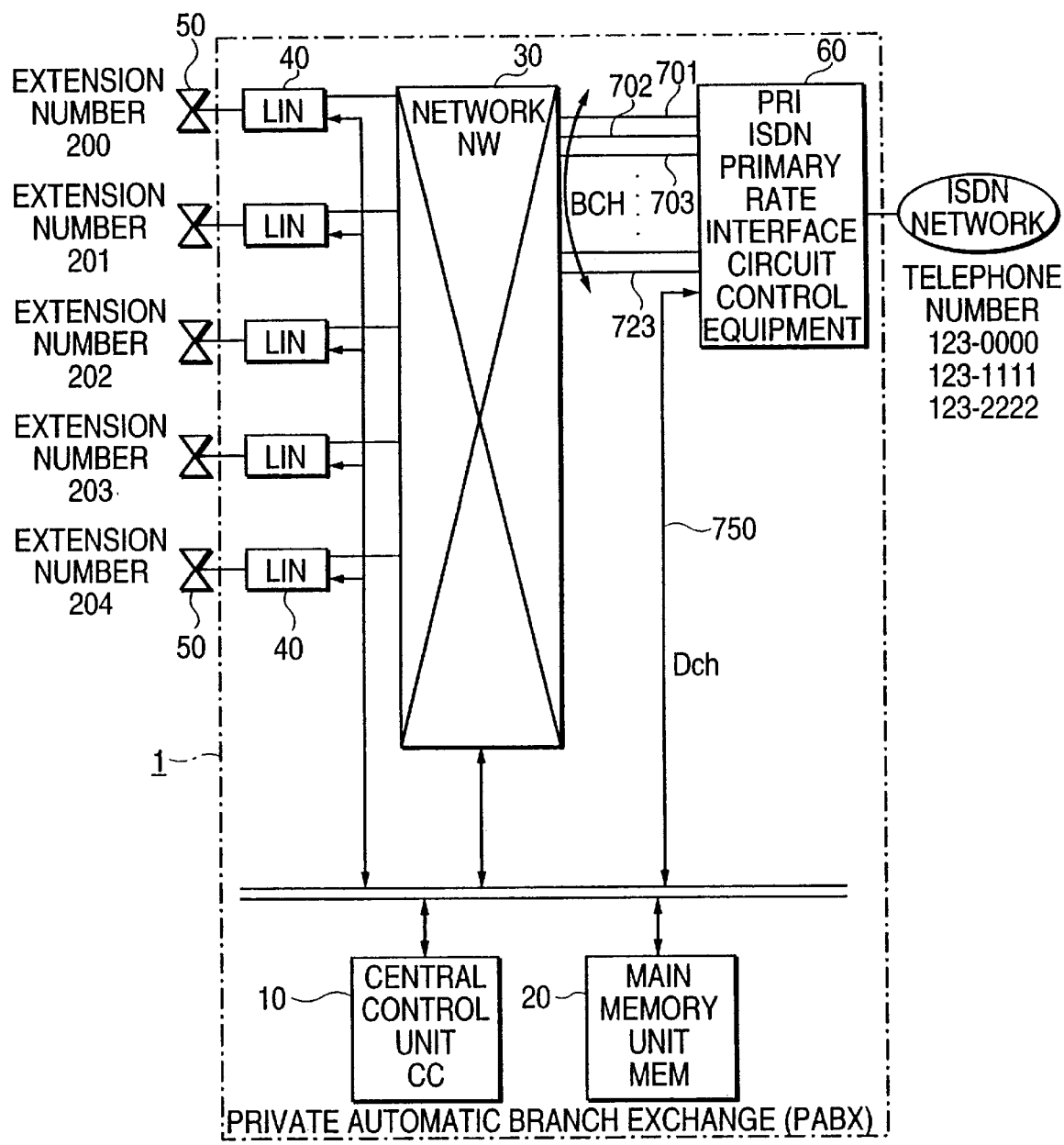
FIG. 1 is a block diagram describing the system structure of the channel division control equipment under this invention.

FIG. 1 describes the entire construction of the PABX accommodating the ISDN primary rate interface circuit and employing the channel division control equipment of the ISDN primary rate interface circuit under this invention. The PABX 1 accommodating the ISDN primary rate interface circuit and employing the channel division control equipment of the ISDN primary rate interface circuit under this invention consists of the central control unit (cc) 10 which executes the program for the PABX 1 to provide exchange service and controls the PABX according to that program, the main memory unit (MEM) 20 where the program for the PABX 1 to provide exchange service and the telephone office data and the control data are stored, the network (NW) 30 of the PABX 1 which switches the call freely, multiple extension telephone control equipment (LIN) 40 which control multiple extension telephones 50 individually, the ISDN primary rate interface circuit control equipment (PRI) 60 which connects the ISDN primary rate interface circuit to the PABX 1 and controls the circuit, the communication channels (B channel, 23 channels) 701~723 of the ISDN primary rate interface circuit, and the control channel (D channel) 750 which controls the ISDN primary rate interface circuit. Furthermore, the extension telephones 50 are connected to each extension telephone control equipment (LIN) 40 of the PABX 1. The central control unit 10, the main memory unit 20, the network 30, and extension telephone control equipment 40 and the ISDN primary group control equipment 60 are connected to each other via a bus.

Next, the structure of the data stored in the above main memory unit 20 of the channel division control equipment of the ISDN primary rate interface circuit is explained using FIGS. 2 through 6.

Figure 2:
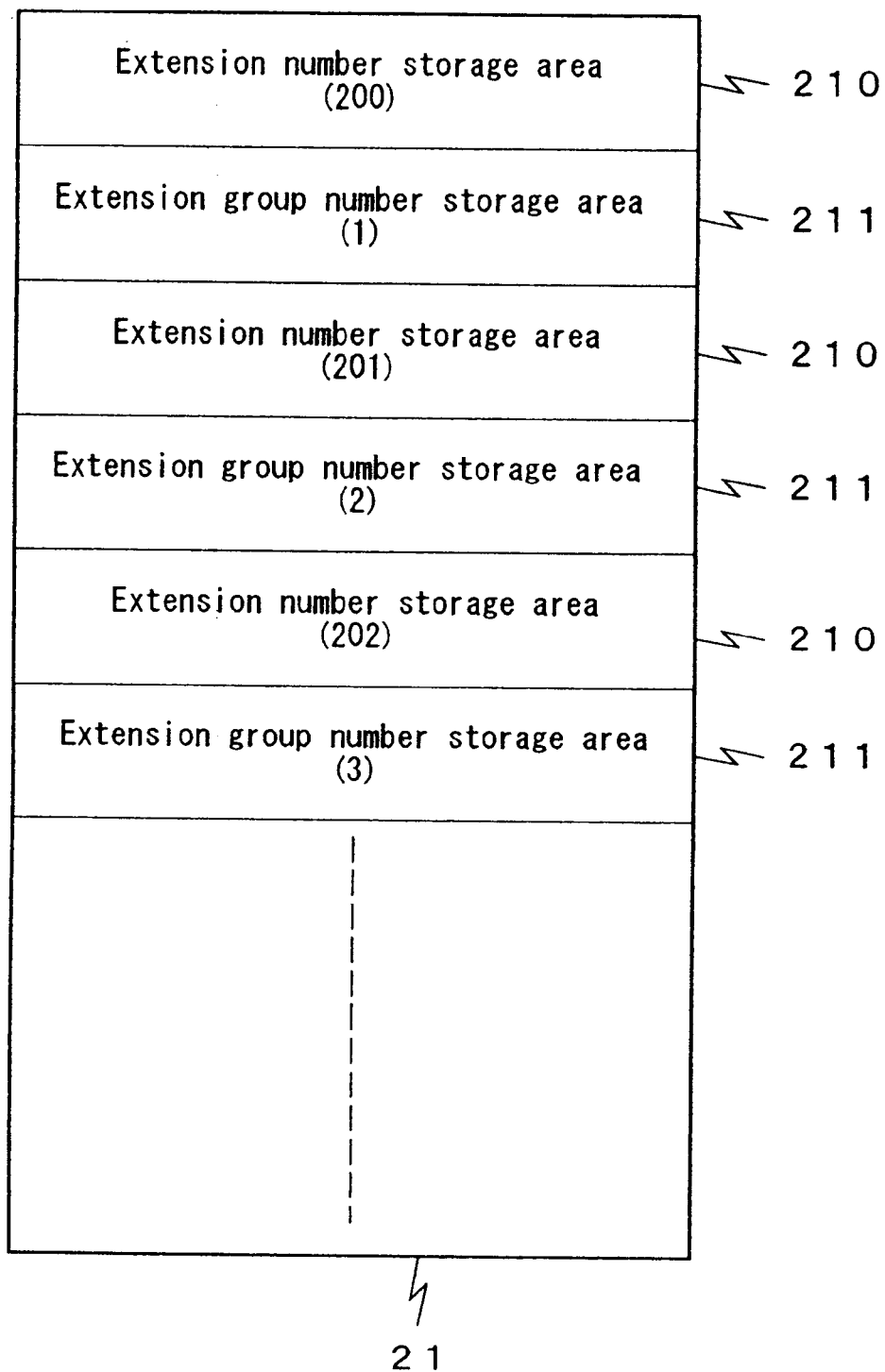
FIG. 2 is a construction drawing of the extension number/extension group cross-reference table stored in the main memory unit.

In FIG. 2, the structure of the extension number/extension group cross-reference table 21 stored in the main memory unit 20 is described. The extension number/extension group cross-reference table 21 stored in the main memory unit 20 consists of the extension number storage areas 210 where the extension numbers are stored and the extension group number storage areas 211 where the extension group numbers relating to those extension numbers are stored, and multiple pairs of the extension number storage area 210 and the extension group number storage area 211 are allocated to the extension number/extension group cross-reference table 21. The extension group number relating to an extension number can be obtained from the relating extension group number storage area 211 by searching the extension number storage area 210 of the extension number/extension group cross-reference table 21 using the extension number.

Figure 3:
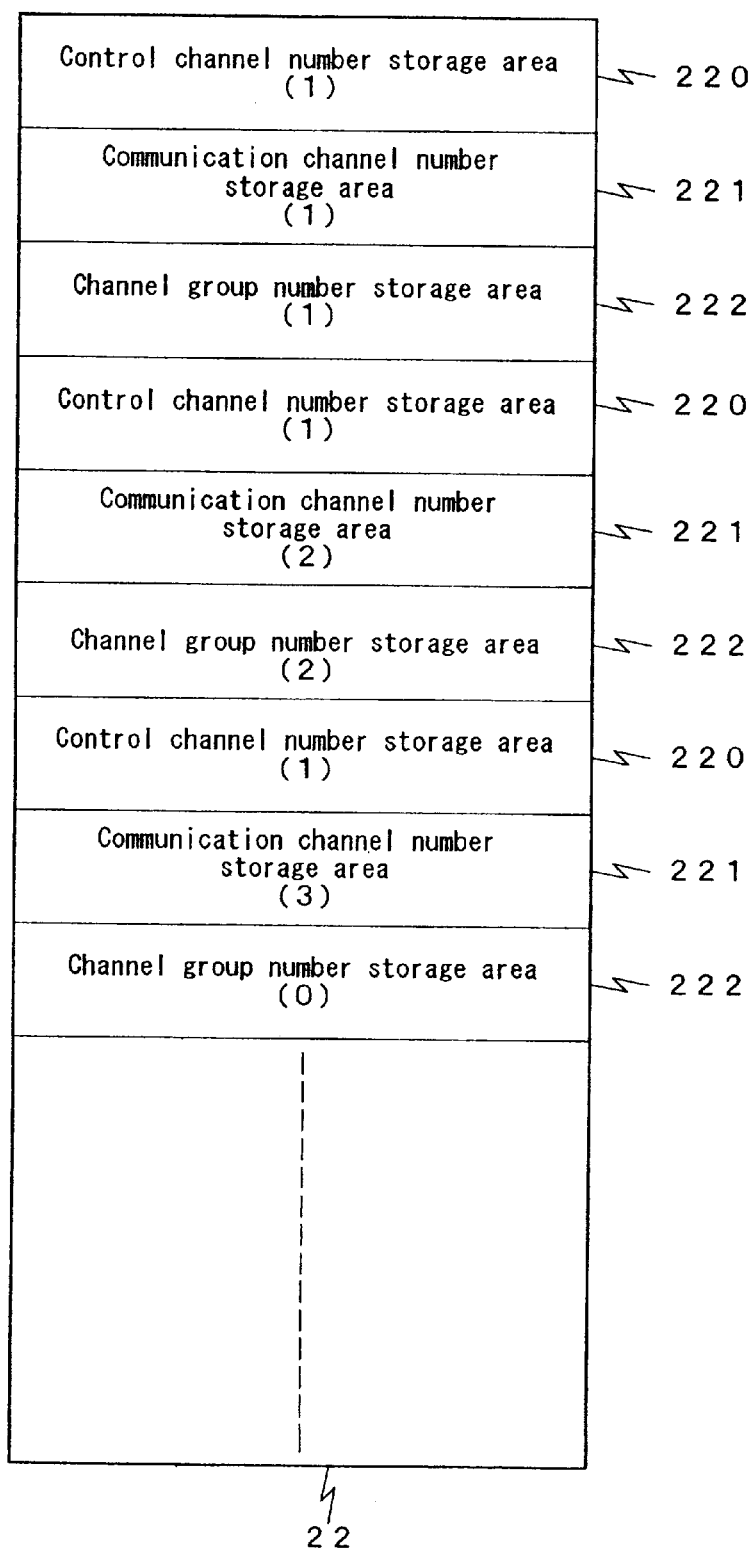
FIG. 3 is a construction drawing of the communication channel/channel group cross-reference table stored in the main memory unit.

In FIG. 3, the structure of the communication channel/ channel group cross-reference table 22 stored in the main memory unit 20 is described. The communication channel/ channel group cross-reference table 22 stored in the main memory unit 20 consists of the control channel number storage areas 220 where the control channel numbers are stored, the communication channel number storage areas 221 where the communication channel numbers allocated to each control channel number are stored, and the channel group number storage areas 222 where the channel group numbers relating to the control channel numbers and the communication channel numbers are stored. The control channel number is a number to identify each primary group circuit when there are multiple ISDN primary rate interface circuits. The control channel number storage area 220, the communication channel number storage area 221 and the channel group number storage area 222 are treated as a group, and multiple numbers of these groups are allocated to the communication channel/channel group cross-reference table 22. A communication channel belonging to the applicable channel group can be obtained from the control channel number storage area 220 and the communication channel number storage area 221 by searching the channel group number storage areas 222 of the communication channel/channel group cross-reference table 22 using the channel group number.

Figure 4:
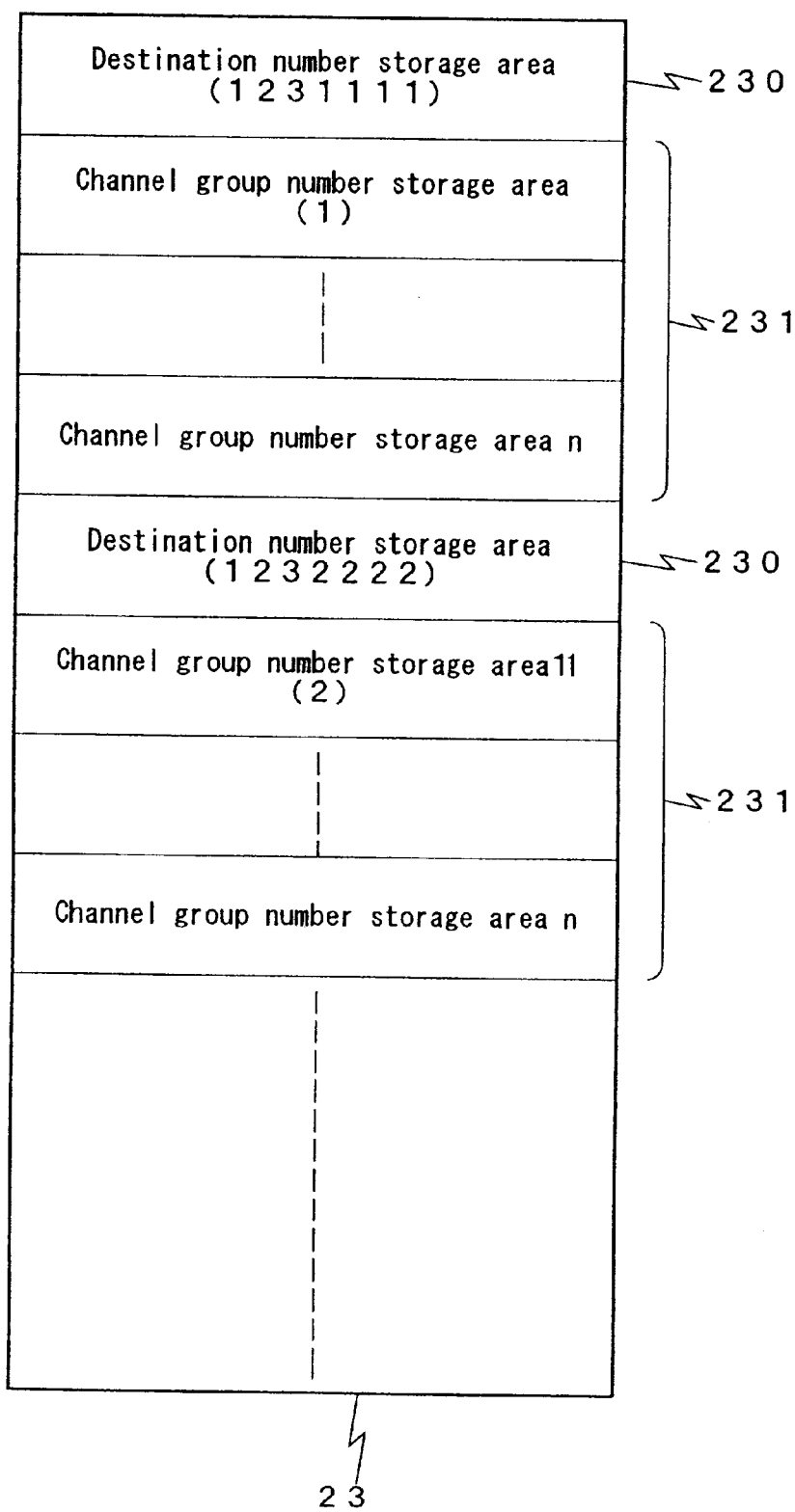
FIG. 4 is a construction drawing of the destination number/channel group cross-reference table stored in the main memory unit.

In FIG. 4, the structure of the destination number/channel group cross-reference table 23 stored in the main memory unit 20 is described. The destination number/channel group cross-reference table 23 stored in the main memory unit 20 consists of the destination number storage areas 230 where the destination numbers are stored and the channel group number storage areas 231 where the channel group numbers allocated to each destination number are stored with the channel group number of a higher priority put on the top, and multiple pairs of the destination number storage areas 230 and the channel group number storage area 231 are allocated to the destination number/channel group cross-reference table 23. The channel group numbers relating to a destination number can be obtained from the channel group number storage areas 231 by searching the destination number storage areas 230 of the destination number/channel group cross-reference table 23 using a destination number.

Figure 5:
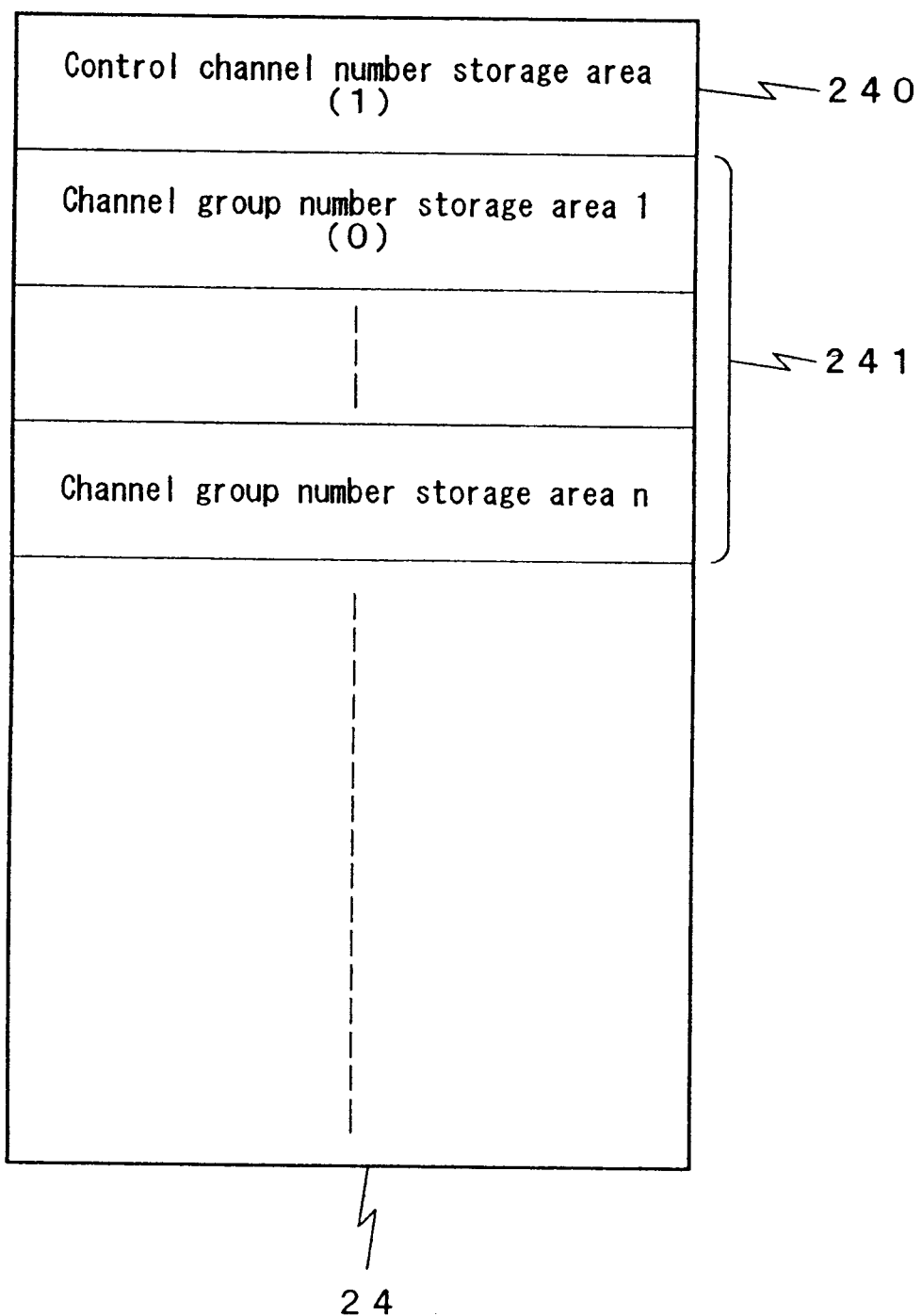
FIG. 5 is a construction drawing of the global channel group cross-reference table stored in the main memory unit.

In FIG. 5, the structure of the global channel group cross-reference table 24 stored in the main memory unit 20 is described. The global channel group cross-reference table is a table which relates the control channel number and the channel group number when a destination number information element informed from the ISDN primary rate interface circuit does not relate with the channel group number or when the destination number information element is not informed. The global channel group cross-reference table 24 stored in the main memory unit 20 consists of the control channel number storage areas 240 where the control channel numbers are stored and the channel group number storage areas 241 where the channel group numbers allocated to each control channel number are stored with the channel group number of a higher priority put on the top. Multiple pairs of the control channel number storage area 240 and the channel group number storage area 241 are allocated to the global channel group cross-reference table 24. The channel group numbers relating to a control channel number can be obtained from the channel group number storage area 241 by searching the global channel group cross-reference table 24 using a control channel number.

Figure 6:
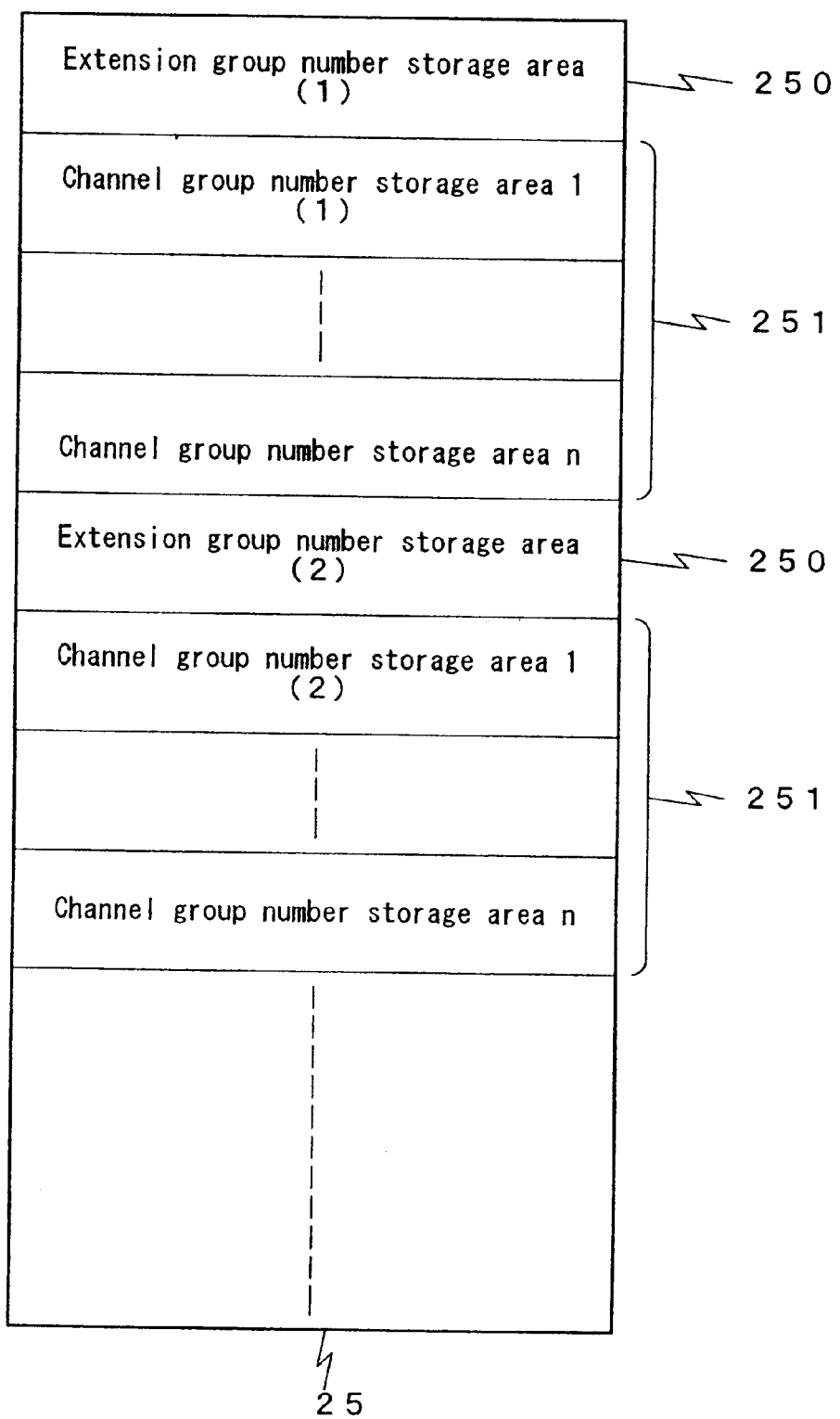
FIG. 6 is a construction drawing of the extension group/channel group cross-reference table stored in the main memory unit.

In FIG. 6, the structure of the extension group/channel group cross-reference table 25 stored in the main memory unit 20 is described. The extension group/channel group cross-reference table 25 stored in the main memory unit 20 consists of the extension group number storage areas 250 where the extension group numbers are stored and the channel group number storage areas 251 where the channel group numbers allocated to each extension group number are stored with the channel group number of a higher priority put on the top, and multiple pairs of the extension group number storage areas 250 and the channel group number storage area 251 are allocated to the extension group/ channel group cross-reference table 25. The channel group numbers relating to an extension group number can be obtained from the channel group number storage areas 251 by searching the extension group number storage areas 250 of the extension group/channel group cross-reference table 25 using an extension number.

Figure 7:
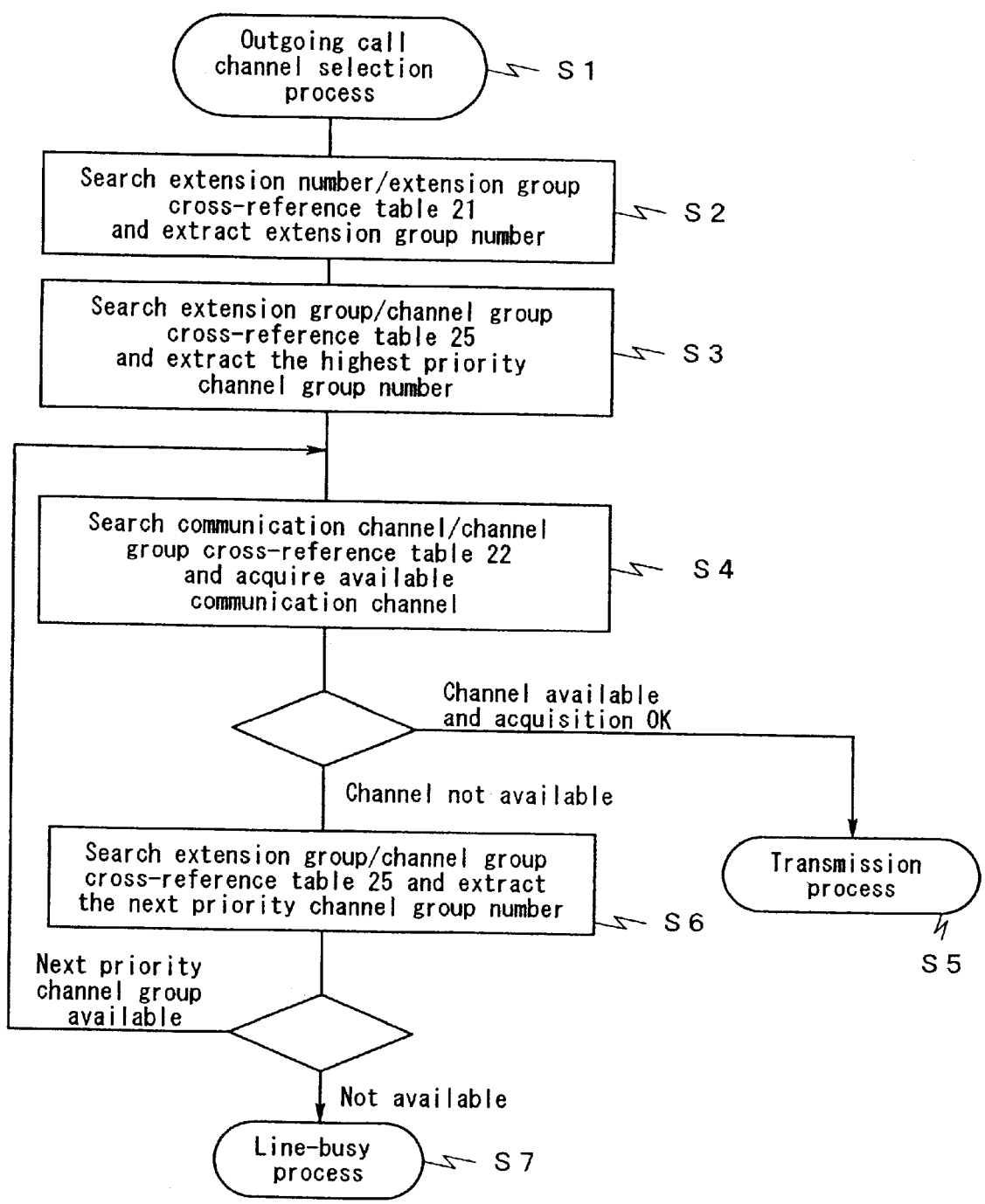
FIG. 7 is a flow chart describing the communication channel selection process at the time of making a call under this invention.
Figure 8:
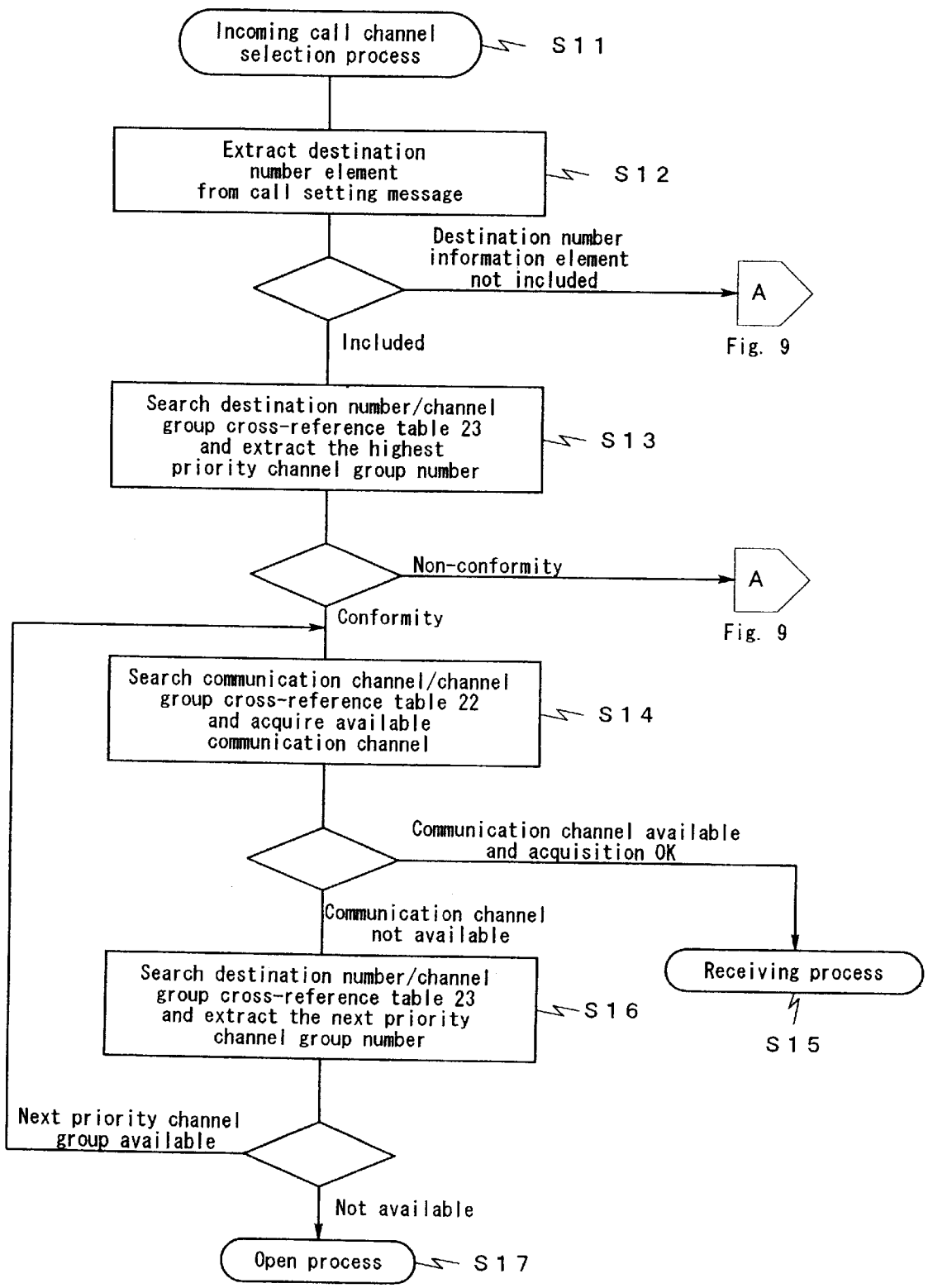
FIG. 8 is a flow chart describing the communication channel selection process at the time of receiving a call under this invention. (Part 1)
Figure 9:
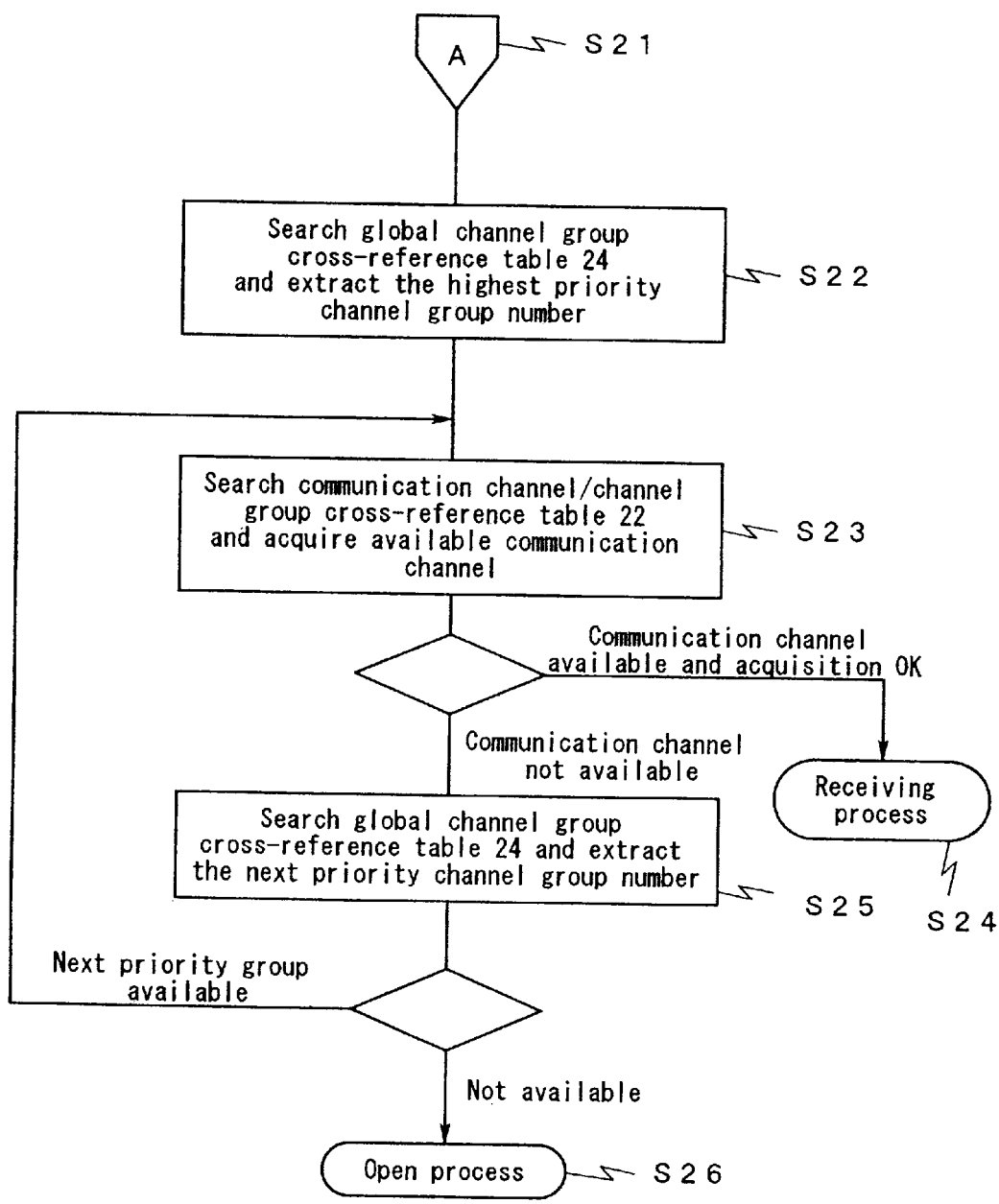
FIG. 9 is a flow chart describing the communication channel selection process at the time of receiving a call under this invention. (Part 2)

Next, the operation of the channel division control equipment of the ISDN primary rate interface circuit under this invention is explained by using FIGS. 7 through 9.

The operation of the communication channel selection process of the central control unit (cc) 10 which is activated when making a call to the ISDN primary rate interface circuit is explained using FIG. 7.

If the transmission channel selection process is activated while the call control is being executed (S1), the central control unit 10 searches the extension number storage areas 210 of the extension number/extension group cross-reference table 21 described in FIG. 2 using the caller's extension number and extracts the applicable extension group number from the extension group number storage areas 211 (S2). Next, the central control unit 10 searches the extension group number storage areas 250 of the extension group/channel group cross-reference table 25 described in FIG. 6 using the extension group number extracted in step S2, and extracts the channel group number of the highest priority from the channel group number storage area 251 (S3). Then, the central control unit 10 searches the channel group number storage areas 222 of the communication channel/channel group cross-reference table 22 described in FIG. 3 using the channel group number extracted in step S3, extracts the applicable control channel number and the applicable communication channel number from the control channel number storage areas 220 and the communication channel number storage areas 221, respectively, checks the availability of the applicable communication channel based on the control channel number and the communication channel number, acquires the communication channel if it is available (S4), and executes the transmission process (S5) Furthermore, if the applicable communication channel is not available, the central control unit 10 executes the aforementioned search process again on the next channel group storage area 222 of the communication channel/channel group cross-reference table 22 (S4).

If no communication channel is available after executing the above search process on all the channel group storage areas 222, the central control unit 10 searches the channel group number storage area 251 extracted in step S3 using the current channel group number to extract a channel group number of the next priority, returns to step S4 and repeats the communication channel selection process using this channel group number (S6). If there is no next priority channel group number in step S6, the line-busy process is executed (S7) as there is no channel available to be selected.

The communication channel selection when making a call is accomplished by the above processes. Therefore, the communication channel used at the time of the ISDN primary rate interface circuit transmission can be used, and the communication channels of the ISDN primary rate interface circuit can be divided for use. Furthermore, as multiple communication channel groups can be set aside and prioritized when making a call to the ISDN primary rate interface circuit, the transmission of a call can be achieved by detouring to a common communication channel group when all the prioritized communication channel groups are busy.

Next, the operation of the communication channel selection process by the central control unit 10 when receiving a call is explained using FIG. 8.

When a call setting message is received and the receiving channel selection process is started (S11), the central control unit 10 extracts the destination number information element from the call setting message (S12). In case the destination number information element is included in the call setting message, the central control unit 10 searches the destination number storage areas 230 of the destination number/channel group cross-reference table 23 using the destination number, and extracts the highest priority channel group number from the channel group number storage area 231 (S13). Next, the central control unit 10 searches the control channel number storage areas 220 and the channel group number storage areas 222 of the control channel number/communication group cross-reference table 22 using the control channel number which received the call setting message and the channel group number extracted in step S13, and extracts the applicable communication channel number from the communication channel number storage areas 221, checks the availability of the applicable communication channel, then acquires the communication channel if the communication channel is available (S14) and executes the receiving process (S15). Furthermore, if the applicable communication channel is busy, the central control unit 10 executes the aforementioned search process once again on the next control channel number storage area 220 and the next channel group storage area 222 of the control channel number/communication channel group cross-reference table 22.

If there is no communication channel available after executing the above search process on all the control channel number storage areas 220 and all the channel group storage areas 222, the central control unit 10 searches using the channel group number extracted in step S13 to extract the next priority channel group number, returns to step S14 and repeats the communication channel selection process (S16). If there is no next priority channel group number in step S16, the open process is executed (S17) as there is no channel available to be selected.

The channel selection in the case when the destination information element is included in the call setting message is accomplished according to the processes described above. Therefore, as the communication channel selection process when making a call is executed based on the caller's information as explained earlier by executing the communication channel selection of the ISDN primary rate interface circuit using the destination number information element, the communication channel used at the time of making a call and the communication channel used at the time of receiving a call can be divided completely. Furthermore, as multiple communication channel groups can be set aside and prioritized when receiving a call from the ISDN primary rate interface circuit, the receiving of a call can be achieved by detouring to a common communication channel group when all the prioritized communication channel groups are busy.

Next, the operation of the communication channel selection process by the central control unit 10, in the case that the destination number information element is not included in the call setting message when extracting a destination number information element from the call setting message in step S12 of the above receiving channel selection process and that the conforming destination number information element does not exist in step S13, is explained using FIG. 9.

The central control unit 10 searches the control channel number storage areas 240 of the global channel group cross-reference table 24 as described in FIG. 5 using the control channel number which received the call setting message, and extracts the highest priority channel group number from the channel group number storage area 241 (S22). Next, the central control unit 10 searches the control channel number storage areas 220 and the channel group number storage areas 222 of the communication channel/channel group cross-reference table 22 using the control channel number which received the call setting message and the channel group number extracted in step S22, extracts the applicable communication channel number from the communication channel number storage areas 221, checks the availability of the applicable communication channel, and acquires the communication channel if the communication channel is available (S23) and executes the receiving process (S24) Furthermore, if the communication channel is not available, the central control unit 10 executes the aforementioned search process on the next control channel number storage area 220 and the next channel group storage area 222 of the communication channel/channel group cross-reference table (S23).

If thee is no communication channel available after executing the aforementioned search process on all the control channel number storage areas 220 and all the channel group storage areas 222, the central control unit 10 searches the channel group number storage area 241 extracted in step S22 using the current channel group number to extract the next priority channel group number, returns to step S23 and repeats the communication channel selection process (S25). If there is no next priority channel group number in step S25, the central control unit 10 executes the open process (S26) as there is no channel available to be selected. The communication channel selection when there is no destination number information element included in the call setting message is accomplished according to the above processes.

As explained above, the operation where the communication channels of the ISDN primary rate interface circuit are allocated to the extension groups is enabled, and at the same time, the control equipment of the PABX which facilitates the change of allocation of communication channels of the ISDN primary rate interface circuit can be offered.

In the above explanations, the channel selection when making the call from an extension telephone is explained. It is a matter of course that the channel selection when making a call from a repeater or a private line can also be accomplished as in the case of a call from an extension telephone by having a memory unit for cross-referencing of the extension group numbers.

EFFECTS OF THE INVENTION

As explained above, the channel division control equipment of the ISDN primary rate interface circuit under this invention enables easy change of the communication channel allocation in a PABX accommodating the ISDN primary rate interface circuit because the communication channel division of the ISDN primary rate interface circuit is accomplished by the PABX only and the communication channels are made into groups.

Furthermore, as the communication channel to be used at the time of the ISDN primary group circuit transmission can be selected, the communication channels of the ISDN primary rate interface circuit can be divided for use, and at the same time, the communication channel used at the time of making a call and the communication channel used at the time of receiving a call can be completely divided based on the fact that the communication channel selection at the time of the ISDN primary rate interface circuit receiving is made based on the destination number information element and that the communication channel selection at the time of the ISDN primary rate interface circuit transmission is made based on the caller's information.

Furthermore, as multiple communication channel groups used at the time of the ISDN primary group transmission and receiving can be set aside and prioritized, certain special effects, such as detouring to a common communication channel when all the prioritized communication channel groups are busy, can be realized.

What is claimed is:

1. An ISDN primary rate interface circuit, comprising:
   a plurality of communication channels;
   a control channel; and
   a channel division controller for private branch exchange having a plurality of extensions and being connected to at least one ISDN primary rate interface unit, said channel division controller including:
   a memory unit which stores selection information for determining conditions for using each of said plurality of communication channels, and
   communication channel selecting means for controlling individually each of said plurality of communication channels by selecting one of said plurality of communication channels of said ISDN primary rate interface circuit as an originating communication channel based on an extension group number which generates a call and said selection information when a call is generated to said ISDN primary rate interface unit from one of said plurality of extensions.

2. An ISDN primary rate interface circuit, comprising:
   a plurality of communication channels;
   a control channel; and
   a channel division controller for private branch exchange having a plurality of extensions and being connected to at least one ISDN primary rate interface unit, said channel division controller including:
   a memory unit which stores selection information for determining conditions for selecting each of said plurality of communication channels, and
   communication channel selecting means for controlling individually each of said plurality of communication channels by selecting a communication channel out of said plurality of communication channels of said ISDN primary rate interface as a receiving communication channel based on said selection information and a destination number extracted from a call setting message notified from said control channel when receiving a call from said ISDN primary rate interface unit.

3. An ISDN primary rate interface circuit, comprising:
   a plurality of communication channels;
   a control channel; and
   a channel division controller for private branch exchange having a plurality of extensions and being connected to at least one ISDN primary rate interface unit, said channel division controller including:
   a memory unit which stores selection information for determining conditions for using each of said plurality of communication channels, and
   communication channel selecting means for controlling individually each of said plurality of communication channels by selecting a communication channel out of said plurality of communication channels of said ISDN primary rate interface as a receiving communication channel by referring to said selection information when receiving a call when no destination number is notified from said ISDN primary rate interface unit.

\* \* \* \* \*